United States Patent [19]

Brogger

[11] 4,351,727

[45] Sep. 28, 1982

[54] DEVICE FOR REMOVING FOREIGN PARTICLES FROM A SOURCE OF FLUID

[76] Inventor: Fredric D. Brogger, 613 20th St., Huntington Beach, Calif. 92648

[21] Appl. No.: 246,478

[22] Filed: Mar. 23, 1981

[51] Int. Cl.³ ............................................. B01D 35/02
[52] U.S. Cl. .................................... 210/411; 210/238; 210/427; 210/449; 137/550; 239/428.5
[58] Field of Search ............... 210/238, 411, 427, 421, 210/446–449; 137/550; 239/428.5

[56] References Cited

U.S. PATENT DOCUMENTS

| 26,965 | 1/1860 | Baxter | 137/550 |
|---|---|---|---|
| 637,264 | 11/1899 | Jennison | 210/427 |
| 3,276,697 | 10/1966 | Aghnides | 239/428.5 |
| 3,789,991 | 2/1974 | Krongos | 210/449 |

FOREIGN PATENT DOCUMENTS

| 698185 | 11/1965 | Italy | 210/427 |
|---|---|---|---|
| 1582 | 4/1879 | United Kingdom | 210/427 |

Primary Examiner—Benoît Castel
Attorney, Agent, or Firm—Harvey C. Nienow

[57] ABSTRACT

A device for removing foreign particles from a source of fluid under pressure which is adaptable to be connected to a faucet or the like. It comprises one or more screens which are provided to collect the foreign particles which might include small stones, calcium deposits and the like, such that the particles cannot pass through the mesh of the screen. Such screens are mounted on a rotatable member having an exteriorly accessible handle whereby the rotatable member and screens thereon can be rotated at least ninety degrees and preferably one hundred eighty degrees so that the force of the fluid under pressure cleans off the screen and enables it to be used again to collect or intercept other additional foreign particles.

3 Claims, 4 Drawing Figures

DEVICE FOR REMOVING FOREIGN PARTICLES FROM A SOURCE OF FLUID

The present invention relates generally to devices for removing foreign particles from a source of fluid, but more particularly to such devices which employ screens for intercepting such particles which may include small stones, calcium deposits or the like.

It is not uncommon today for ordinary household water faucets to be provided with fittings which carry a small screen through which the water is directed. The screen is selected to have a predetermined wire mesh size so as to collect particles which are present in virtually all household water sources. Frequently, there are several such screens positioned in the path or flow of the water to collect such particles and to prevent them from being carried into a drinking glass or the like.

Such prior devices or fittings require periodic cleaning. Firstly, they must be removed from the faucet and the foreign particles brushed or washed away from the screen and thereafter the fitting carrying the screen replaced on the end of the faucet. This is necessary because the foreign particles clog the screen and restrict the flow of water or other fluid therethrough. After such cleaning, the flow of fluid is substantially unimpeded until a further accumulation of foreign particles results.

Such prior devices have required someone to remove them and clean them as indicated above. This has been a nuisance and has resulted in many faucets remaining particlly clogged to the flow of fluid therethrough.

It is an object of the present invention to provide a device for removing foreign particles from a source of fluid which can be cleaned in an extremely short period of time.

A further object of the present invention is to provide a device as characterized above which can be manually cleaned and rendered operational without the need for any mechanical skills or physical dexterity of any kind whatsoever.

An even further object of the present invention is to provide a device as characterized above wherein a screen is employed to intercept or catch foreign particles in a stream of fluid, but wherein the screen can be quickly and easily rotated at least ninety degrees so that the accumulated foreign particles can be flushed away.

A still further object of the present invention is to provide a device as characterized above which is adapted to fit on the end of a faucet and wherein a finger-operated handle or lever is provided for rotating the screen whenever desired.

An even still further object of the present invention is to provide a device as characterized above which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
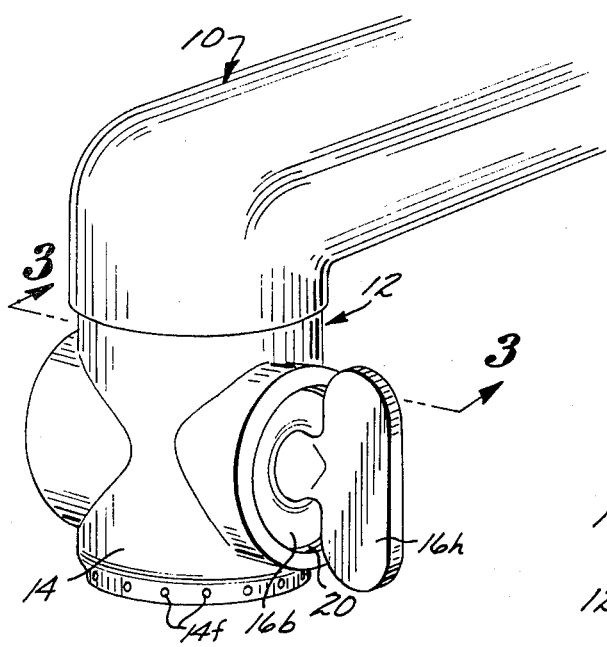
FIG. 1 is a fragmentary perspective view of a water faucet adapted with a device according to the present invention.

Referring to FIG. 1 of the drawings, there is shown therein a faucet 10 whereon a device 12 is provided according to the present invention. Device 12 comprises a main body 14, the upper end portion 14a of which is provided with external fastening threads 14b for engagement with internal fastening threads 10a at the end of the faucet 10. A through opening 14c is formed in body 14 to provide an inlet 14d and an outlet 14e. Such through opening 14c may be generally cylindrical in construction as will be readily apparent to those persons skilled in the art. A series of transverse through openings 14f is provided about the periphery of the lower end portion of body 14 which act as aeration holes, as is common in such plumbing devices. In this regard, the rapid flow of water through the device 12 causes a venturi action at such outlet 14e to draw air through such openings 14f for intermixing of the same with the water or other fluid.

Figure 2:
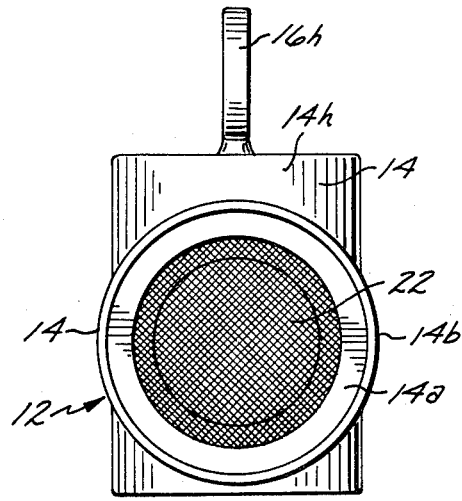
FIG. 2 is a top plan view of a device according to the present invention.

Body 14 is further formed with a cyclindrical transverse opening 14g whose axis or centerline intersects with the axis or centerline of through opening 14c, generally at right angles to each other. To provide such cylindrical opening 14g, an extension or boss 14h may be formed on body 14 as shown most particularly in FIGS. 1, 2 and 3 of the drawings.

Figure 3:
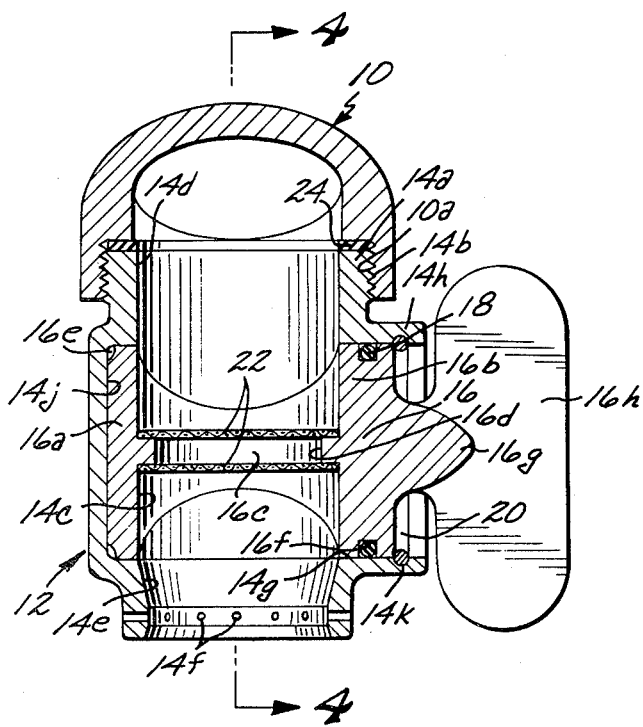
FIG. 3 is a longitudinal sectional view through the device of FIG. 1, taken substantially along line 3—3.

Positioned within opening 14g is a rotatable member 16 having circular bearing members 16a and 16b as shown in FIG. 3. Interconnecting such bearing members is a platform or wall 16c formed in member 16 and provided with a through aperture 16d.

Bearing member 16a is formed with an arcuate bearing surface and an annular cutout or recess 16e to enable the bearing member 16a to fit within an annular recess 14j formed within body 14.

Bearing element 16b is formed with an arcuate bearing surface and an annular groove 16f for receiving an O-ring 18 for sealing the bearing element 16b within the cylindrical opening 14g of body 14.

The end 16g of rotatable member 16 is formed with a manually operable handle or lever 16h whereby the entire rotatable member 16 can be operated as will hereinafter be explained.

A snap ring 20 is positioned within an annular groove or recess 14k formed in the cylindrical opening 14g of body 14.

One or more screens 22 (two of which are shown in the drawings) are fixed to the platform or partition wall 16c over the aperture 16d therein. In this regard, the screen or screens 22 may be cemented to the partition wall 16d or to opposite sides thereof as shown. The mesh or size of the openings in such screens 22 is determined empirically so that such openings are small enough to prevent passage therethrough of the size of foreign particles or material to be intercepted.

Figure 4:
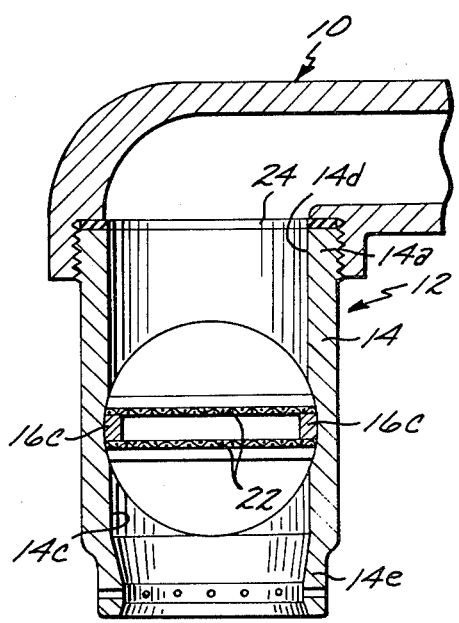
FIG. 4 is a fragmentary sectional view taken substantially along line 4—4 of FIG. 3 of the drawings.

Device 12 is threadedly connected to the end of faucet 10, and to provide the proper seal therebetween, an annular washer 24 may be used as shown in FIGS. 3 and 4. In this regard, it is well realized that substantially any kind of fastening means might be employed for connecting or fastening the device 12 to the faucet 10, such as either internal or external fastening threads on body 14 and the complementary formed threads on the faucet.

With the device 12 thus affixed to the faucet 10, water can be caused to flow through the faucet as well as the through opening 14c of body 14. Whatever foreign particles are carried by the water will be intercepted or blocked and caused to accumulate on the screens 22. At the same time, the water or fluid will be aerated as above mentioned through the transverse openings 14f in the end of body 14.

Ultimately, the foreign particles accumulated on screens 22 will impede the flow of water through the device 12. To wash away such foreign particles, it is merely necessary to rotate the handle 16h at least ninety degrees. This causes the member 16 to be rotated correspondingly, and with the screens in this position, or in the totally inverted position, as desired, the flow of water through the body 14 causes the foreign particles to be washed through the device 12. Thereafter, the rotatable device 16 can be returned to its original position or can remain in its so-called inverted position until additional foreign particles are accumulated on the screens 22. Before that occurs, however, the screens 22 will be clean so as to permit easy flow of fluid through the device 12.

If and when it becomes necessary to remove the rotatable member 16 from the body 14, as for instance for replacement of the screens 22, it is merely necessary to remove snap ring 20 from annular groove 14k and thereafter slide the entire rotatable member 16 out through the cylindrical opening 14g of body 14. The screens 22 can then be replaced and the entire rotatable member 16 reinserted into the body 14. The O-ring 18 prevents leakage of fluid between the bearing surface of member 16b and the internal surface of extension or boss 14h. The snap ring 20, of course, can be returned to its proper position within the annular groove 14k to prevent accidental or inadvertent removal of the rotatable member 16.

It is thus seen that the present invention provides a device for removing foreign particles from a source of fluids, and which device can be easily and quickly cleaned and returned to operation without the need for any special tools or special mechanical skills or dexterity. Although I have shown and described certain specific embodiments of my invention, I am well aware that many modifications thereof are possible. The invention, therefore, is not to be restricted except insofar as is necessitated by the prior art and by the spirit of the appended claims.

I claim:

1. A device for removing foreign particles from a source of fluid comprising in combination, a cylindrical body formed with a through opening providing an inlet having fastening means for attachment of said body to a faucet and an outlet, filter means including a member rotatably positioned within an internal arcuate recess of said body between said inlet and outlet for rotation about an axis at substantially right angles to the axis of said through opening, said rotatable member comprising two spaced arcuate bearing surfaces, a wall aligned with said axis of rotation and formed with an aperture providing a pair of oppositely-facing annular ledges, said body having two bearing surfaces formed complementally of the bearing surfaces of said rotatable member, means operable between said rotatable member and said body for retaining the rotatable member in said body, a substantially flat, co-planar filter screen for each of said ledges and respectively secured thereto in close proximity to said axis of rotation, each of said screens being of predetermined mesh to prevent passage therethrough of foreign particles, and operating means for said filter means secured to said member and extending externally from said body to enable said filter means to be manually rotated 180 degrees about its axis and said filter screens to be rotated therewith substantially at said axis of rotation.

2. A device for removing foreign particles from a source of fluid according to claim 11 wherein each of said filter screens is bonded to its respective ledge about its marginal edge.

3. A device for removing foreign particles from a source of fluid according to claim 2 wherein said filter screens are substantially equidistant from and in close proximity to said axis of rotation when secured to said ledges.

* * * * *